United States Patent [19]

Ablett

[11] 3,801,741

[45] Apr. 2, 1974

[54] FEATURE SELECTION IN IMAGE ANALYSIS

[75] Inventor: Roger John Herbert Ablett, Potton, England

[73] Assignee: Image Analysing Computers Limited, Melbourne, Royston Hertfordshire, England

[22] Filed: Apr. 28, 1972

[21] Appl. No.: 248,550

[30] Foreign Application Priority Data

Apr. 30, 1971 Great Britain .................... 12313/71
Aug. 26, 1971 Great Britain .................... 40008/71

[52] U.S. Cl..... 178/6.8, 178/DIG. 36, 178/DIG. 22, 235/92 PC, 340/324 A
[51] Int. Cl......................... G06m 11/04, H04n 7/18
[58] Field of Search....... 178/6.8, DIG. 36, DIG. 22; 340/324 A; 235/92 PC

[56] References Cited

UNITED STATES PATENTS 3,758,717 9/1973 Granzotti ............................ 178/6.8
3,579,249 5/1971 Dewey ........................ 178/DIG. 36

*Primary Examiner*—Howard W. Britton
*Attorney, Agent, or Firm*—Browne, Beveridge, De Grandi & Kline

[57] ABSTRACT

Circuit arrangements are described by which a signal from a so-called light pen is employed to gate the output from a threshold detector set to detect amplitude excursions of a video signal which exceed a reference voltage. In this way the detected signal pulses corresponding to a feature towards which the light pen is pointed, alone, are released and measurements may be made thereon to provide information about the selected feature.

A preferred form of light pen is described in which switch means is provided by which it is possible to select which of a plurality of stores is to be supplied with the information obtained about any feature. In this way operator controlled pattern recognition may be performed.

16 Claims, 9 Drawing Figures

FEATURE SELECTION IN IMAGE ANALYSIS

Figure 1:
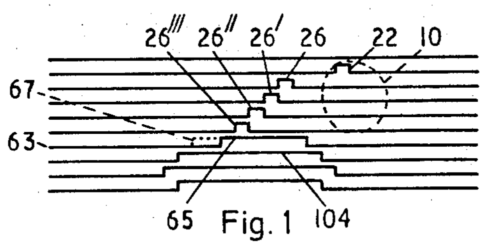

This invention concerns feature selection in image analysis.

By a feature is meant a region in a field whose light reflecting or transmitting properties differ from the surrounding field so that it can be visually distinguished. In image analysis, the field is illuminated by an appropriate form of light (i.e., transmitted or reflected light) and a video signal is obtained by scanning an image of the field focussed for example onto a target of a television camera tube. In the same sort of manner, a specimen may be scanned by an electron beam as in a scanning electron microscope and a similar video type signal produced from e.g., the specimen current variations or the back scatter of the electrons.

Hereinafter the term scanned electrical video signal will be intended to cover either of these two sources. However to simplify description, reference will be made to a television camera set to view a field illuminated by incident light.

The amplitude of the video signal will be modulated in dependence on the variations in brightness of the field. Conventionally the amplitude will increase with brightness from a first amplitude level corresponding to no light (i.e., black) to a maximum or peak white level.

If as is usual the field is scanned in a series of parallel spaced apart lines, the video signal amplitude will vary along each line scan and the instantaneous value will depend on whether the scanning spot at that instant is inspecting a light or dark region of the field. If a simple dark grey feature is considered superimposed on a light background, the video signal amplitude will drop from a high value to a low value as soon as each line scan intersects the feature and will remain at this lower value until the scanning spot once again leaves the feature. Since the spot is considered to move with constant velocity, the duration of the amplitude change in the video signal will represent the length of the chord produced by that particular line scan intersecting the feature.

Various geometrical measures of the feature can be obtained by mathematically processing the amplitude variations due to these chord intersects. However to render the signals corresponding to the chord intersects into a usable form, the video signal is subjected to so-called detection by which the instantaneous amplitude of the video signal is compared with a threshold voltage which is set between the amplitude of the video signal corresponding to the background and that corresponding to the feature. When the video signal amplitude is less than the threshold voltage, it is an indication that the scanning spot is inspecting the feature and the output of the comparator used in the detection stage is consequently adapted to generate a 1-state of a binary type signal when the video signal amplitude is below the threshold and a 0-state for the binary signal when the video signal amplitude is greater than the threshold.

Each 1-state of the binary signal can be thought of as constituting an electrical pulse which will hereinafter be referred to as an intersect pulse. In known manner the intersect pulses may be combined to generate a signal indicating the area of the feature and in addition the horizontal and vertical projections of the feature can be obtained from the intersect pulses.

Where there is more than one feature in a field, the intersect pulses obtained during a complete field scan will relate to the two or more features in the field. Likewise any video signal information gated by these pulses will also relate to all the features in the field and unless only a total or average value is desired, specific values for each feature of area, density etc., cannot be obtained unless an associated parameter computer controlled by an appropriate coincidence detector is employed as described in British Pat. Specification No. 1264805.

An alternative approach consists in selecting only the intersect pulses obtained from scanning one of the features are the field and allowing only the selected intersect pulses to pass as an output signal during a single field scan. The present invention is concerned with a device referred to as a Light Pen and a system employing such a pen by which each feature in the field may be selected at will and only the intersect pulses arising from scanning the selected feature will appear in the output. In this way each feature of interest in a field can be analysed separately and if television type scanning standards are employed, the speed of the process is limited only to the speed at which the operator can select different features.

In the present context a Light Pen comprises a photo-sensitive circuit element which produces an electrical signal or a change in an electric current passing through it when the quantity of light incident thereon changes, means for restricting the field of view of the photo-sensitive circuit element so taht only changes in illumination within the field of view affect the electrical characteristics of the circuit element and means whereby the circuit element may be positioned so that the field of view constitutes a restricted area of a television monitor screen.

Typically the photo-sensitive circuit element comprises a photo-sensitive diode whose conduction increases with increasing illumination.

According to one aspect of the invention, in a system which employs a light pen for selecting features from a displayed picture there is provided circuit means for recirculating an electrical pulse from the photo-sensitive circuit element of the light pen on the next and subsequent line scans, means for sensing coincidence between the recirculated pulse and an intersect pulse occuring during one of the scan lines of the displayed picture and further circuit means for releasing at least the coincident portion of the intersect pulse and each intersect pulse arising on subsequent line scans which are at least in part coincident with a signal released by said further circuit means on the preceding line scan.

Preferably the sensing of coincidence inhibits the further recirculation of the gating signal.

Preferably the signal from the photo-sensitive circuit element is employed to set a bistable which is only reset at the end of a complete field scan. Furthermore, a monostable device is conveniently employed to generate a short gating pulse from the leading edge of the set condition signal of the bistable device.

According to a second aspect of the invention, the circuit means employed for releasing the first and subsequent intersect pulses for the selected feature employs the first intersect pulse as a gating signal to release some or all of an intersect pulse concident therewith on the next line scan. The intersect pulse so released is then employed in the same manner to release any coincident intersect pulse on the next line until no coincident intersect pulse is found on a succeeding line scan. This is taken to indicate the end of the feature.

According to a third aspect of the invention additional circuit means is provided for opening the gate for each succeeding line scan earlier in time than if the intersect pulse from the preceding line alone were employed to control the gate. Such facility is described as "look ahead" and a capture zone is generated in front of the leading edge of each feature in the field. Preferably further circuit means is provided to inhibit the passage of intersect pulses arising in the capture zone which do not relate to the feature generating the capture zone.

The intersect pulses released by the said further circuit means may be employed to gate the original video signal so that the analogue amplitude variations of the video signal arising from scanning a selected feature may be isolated from those corresponding to the remainder of the field.

The present invention allows pattern recognition to be performed on the features in a field under analysis. By pattern recognition is meant the recognition of features all belonging to one class, having a common characteristic such as shape colour etc.

According to another aspect of the present invention in an image analysis sytem including a scanning device for obtaining electrical signals representative of features in a field, a Light Pen for isolating electrical signals relating to a specific feature in a field and computer means for computing a value for a parameter of the specific feature, switching means is provided operable to select which of two or more stores are to receive the signals relating to the computed parameter value for the specific feature.

The electrical signals relating to the features may be the amplitude varying video signal obtained from scanning an image of the field as by a television camera thereby to permit density and volume measurements to be performed on the features as described in our co-pending British Pat. Application No. 9737/71 or alternatively may be the electrical pulses forming a so-called detected signal obtained by threshold detecting the amplitude variations of the video signal thereby permitting calculation of parameters such as area, horizontal and vertical projection and perimeter etc. as described in our co-pending British Pat. Application No. 9738/71.

Conveniently two or more parameters may be computed simultaneously from the signals isolated by the Light Pen, separate stores being provided together with an appropriate number of simultaneously operable switches for directing the computed values to the separate stores for the different values.

One possible application for the invention is to isolate the total area of e.g., circular features from that of e.g. triangular features in a field under analysis. To this end the switching means provided by the invention comprises two separate switches one earmarked circle and the other earmarked triangles. The analysis is performed by pointing the Light Pen to each feature in the field and depressing the switch marked circle if the feature is circular or the switch marked triangle if the feature is triangular.

The switching means may take any convenient form and may be push button switches or foot operated switches depending on the application.

In a preferred arrangement the switches forming the switching means are mounted directly on the Light Pen so as to be actuable by the forefinger of the hand of the operator holding the Light Pen.

In order to render a Light Pen largely insensitive to changes in ambient lighting a display tube having a so-called dual phosphor may be employed in which one component of the phosphor emits visible light when bombarded by electrons and the other component emits, for example, ultra violet light. A photo-sensitive circuit element is then employed in the Light Pen having a good response to ultra violet light and a poor response to light in the visible range.

Figure 2:
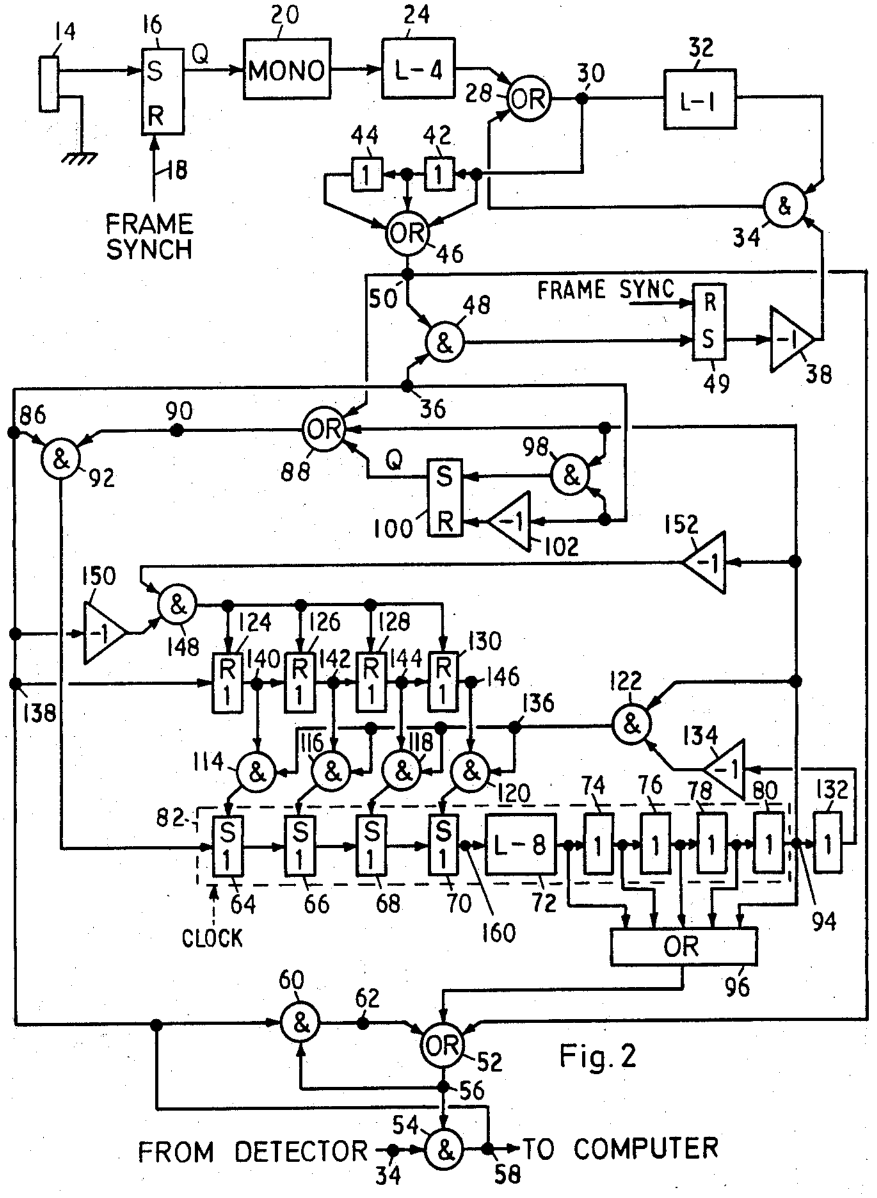
Figure 3:
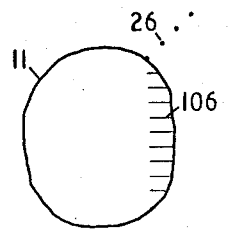

The invention will now be described by way of example with reference to the accompanying drawings in which:

FIG. 1 illustrates graphically gating signals generated in accordance with the invention intersecting intersect pulses of a feature arising in later scans in the raster, FIG. 2 is a block circuit diagram of part of an image analysis system employing a light pen for selecting features in a field, FIG. 3 illustrates diagrammatically those line scan intersect pulses which would be released by light pen selection without so-called "look ahead,"

Figure 4:
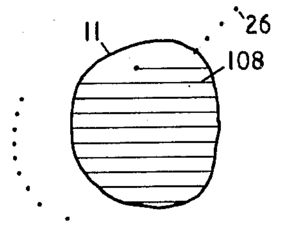
Figure 5:
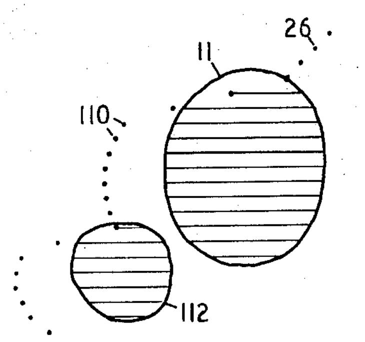

FIG. 4 illustrates diagrammatically the intersect pulses which will be released for the same feature of FIG. 3 if "look ahead" is provided, FIG. 5 illustrates the effect of unqualified "look ahead,"

Figure 6:
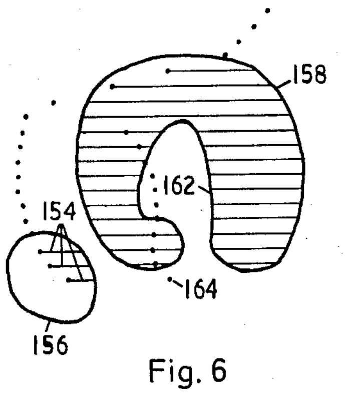
Figure 7:
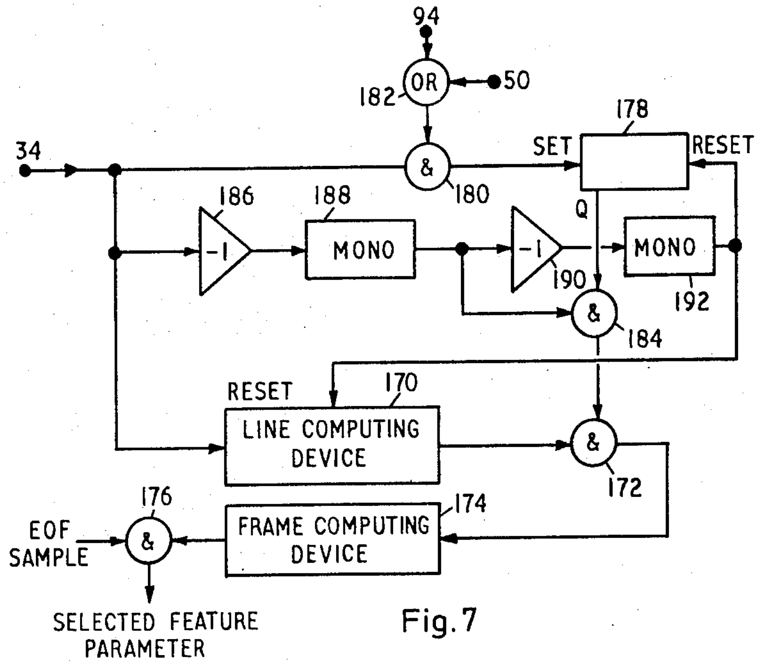
Figure 8:
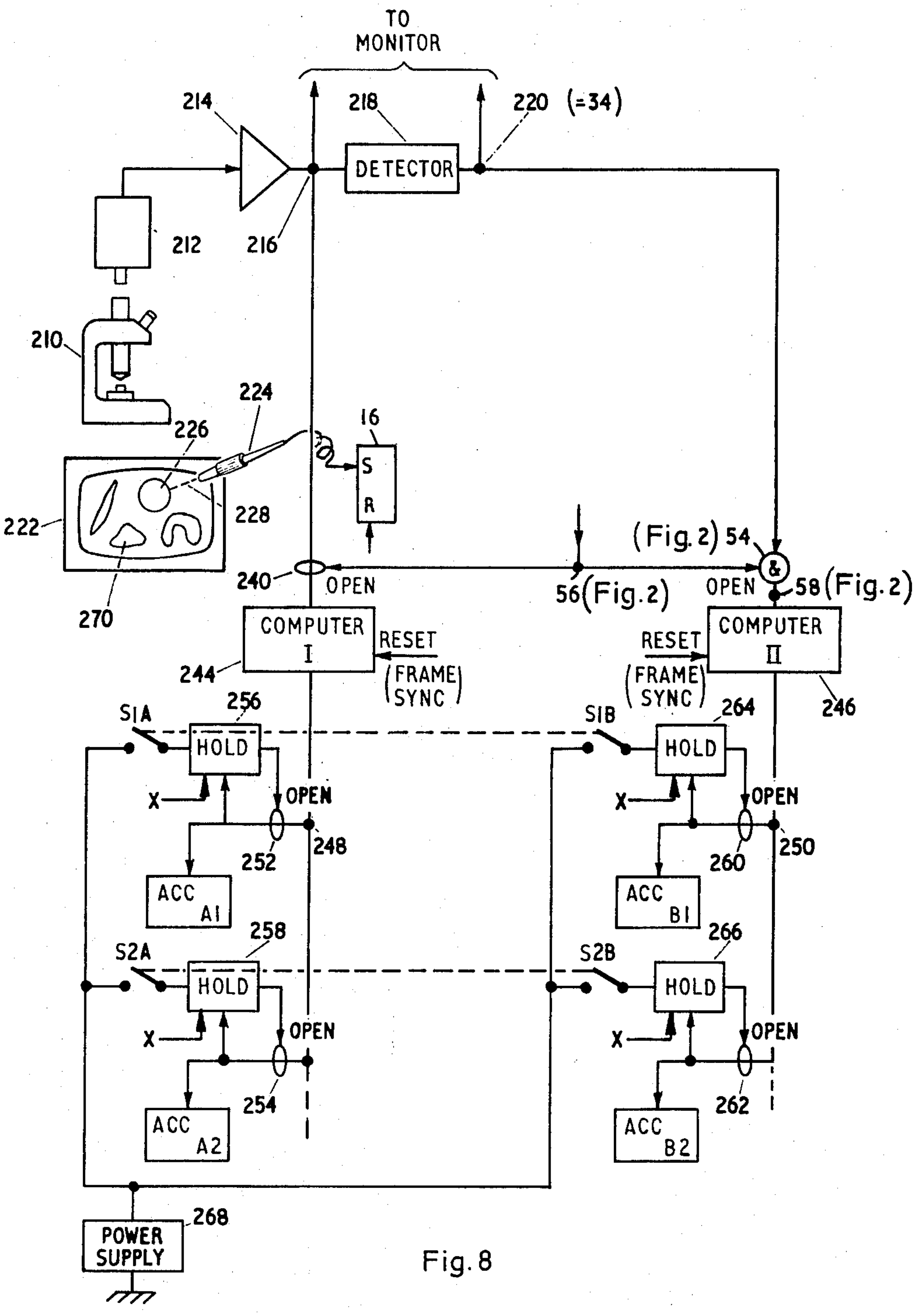
Figure 9:
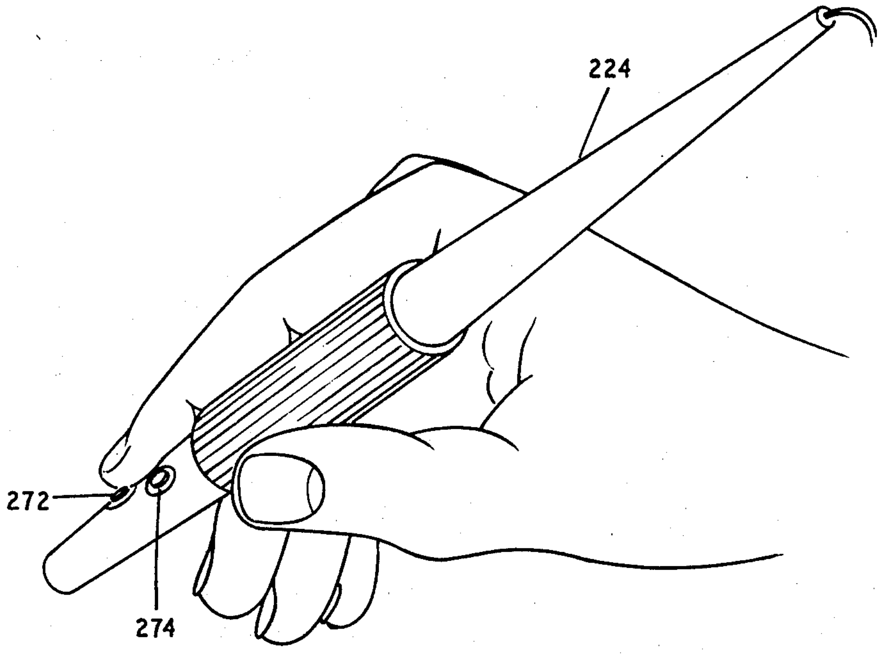

FIG. 6 illustrates the effect of inhibiting intersect pulses arising during the "look ahead" capture zone generated by the intersect pulse on the preceding line if such intersect pulses are not continuous with the intersect pulse within the feature on the current line, FIG. 7 is a block circuit diagram of a modification which may be added to the circuit of FIG. 2, FIG. 8 is a block circuit diagram of an image analysis system including a light pen which includes pattern recognition switching means, and FIG. 9 is a close-up perspective view of a light pen which includes pattern recognition push-button switches.

A light pen (not shown) is assumed to be pointed towards a television monitor screen and the diagrammatic representation of FIG. 1 illustrates the lines forming part of the scan raster. Superimposed on the lines is a region 10 illustrating the typical field of view of the light pen. The scanning spot on the screen is assumed to scan from left to right and the first phosphor element on the screen to be scanned within the field of view 10 causes a sudden change in the electrical conduction characteristics of the photo sensitive device 14 (see FIG. 2) in the light pen. Typically device 14 is a photo diode.

The change in the electrical characteristics of device 14 serves to set a bistable device 16 whose reset input 18 is supplied with a signal derived from the frame synchronising signal at the end of each field scan. Bistable device 16 can thus only be set once during any single field scan.

If each line is considered to be divided into a large number of equally spaced points the time interval (referred to as a picture point time interval) is the time taken to scan the distance between two points in a line.

In its set condition bistable device 16 produces a Q output which serves as input to a monostable device 20 designed to produce a single pulse of duration equal to one picture point interval shown diagrammatically at 22 in FIG. 1. Pulse 22 is delayed for one line less four picture point intervals by delay 24 (see FIG. 2) and this is shown on the next line in the raster of FIG. 1 and is identified by a reference numeral 26. The shift produced by delay 24 simply moves the beginning of the trace generated by the light pen to the left of the "point" represented by 22. It is not essential and delay 24 may be left out without affecting the actual operation of the circuit.

Pulse 26 is applied via OR-gate 28 to junction 30 at the input of a delay device 32. The output from 32 comprises one input to an AND-gate 34 whose output provides the second input to OR-gate 28. A second input for AND-gate 34 is obtained from an inverting amplifier 38 the action of which is to provide a signal at gate 34 to allow each delayed pulse to be recirculated via OR-gate 28 and delay 32, until there is coincidence between a pulse at junction 30 and an intersect pulse at junction 36. The delay 32 delays the signal at junction 30 by one line scan less a picture point interval so as to produce pulses 26′,26″ etc. Delay 32 is typically a shift register.

If displayed on a monitor screen the pulses 26,26′ etc., will produce a trace starting at the point corresponding to pulse 26. Since the trace signals are to be used as gating signals, the trace pulses 26,26′ etc., appearing at junction 30 are applied to two delay devices 42 and 44 connected in series and each introducing a delay of one picture point interval so that a three picture-point-interval-wide gating signal can be formed. Typically 42 and 44 are bistable elements of a shift register. The input to the delays 42 and 44 provides one input and the outputs of the two individual devices the other two inputs of a three input OR-gate 46. The output of this latter provides the 3 picture point gating signal which is applied together with any signal appearing at junction 36 to the two inputs of an AND-gate 48. A signal at the output of this latter gate will indicate coincidence between the gating signal and an intersect pulse. This signal serves to set a bistable device 49 (which is reset at the end of the frame by the frame synch. pulse). When set, device 49 produces an output signal for inverting amplifier 38, thereby cancelling the signal previously present at AND-gate 34 and inhibiting recirculation of the pulse in the delay 32.

The output of OR-gate 46 appears at junction 50 and from here is applied via OR-gate 52 to one of the inputs of AND-gate 54 via junction 56. If a detected video signal pulse, appearing at junction 34, coincides in time with the three picture point wide gating signal at junction 56, it is passed to junction 58 (i.e., the output of AND-gate 54).

A signal at junction 58 will be applied to one input of AND-gate 60 and since the signal at junction 56 constitutes the other input to AND-gate 60, an output will appear at junction 62 thereby providing a continuous signal at junction 56 for the duration of the intersect pulse occuring at junction 34. In this way the signal at junction 56 is not made dependent in duration on the three picture point wide gating signal from OR-gate 46 as was previously the case. The first such detected video signal pulse to be relased is shown on line 63 in FIG. 1 and is identified by reference numeral 65.

It will be appreciated that only that portion of the pulse 65 which is coincident with and follows the three picture point wide signal from OR-gate 46 will be released to junction 58 and any portion of the pulse 65 occurring in advance of the three picture point wide signal from OR-gate 46 (such as that shown in dotted outline at 67) will be lost.

The system illustrated in FIG. 2 can be used with an image analysis system in which the analogue video signal is sampled at regular intervals of time controlled by clock pulses from a master oscillator. Typically the analogue video signal is sampled approximately 1,000 times along each line scan. Although not shown each sampled amplitude value is compared with a threshold voltage to effect so-called detection and a binary type detected video signal is generated having a one state at the sampling point if the amplitude satisfies the threshold criterion and a zero state if this condition is not satisfied. A so-called "blank frame" gating signal is obtained by delaying the intersect pulse coincident with the gating signal by one line scan period and using the delayed signal to release any coincident intersect pulse on the next line. Any signal so passed is delayed by the same amount and used to pass any coincident intersect pulse on the next succeeding line, and so on. Since the intersect pulses are binary in form, shift registers may be used in the system of FIG. 2, for storing the intersect pulses of the detected video signal.

Pulses appearing at junction 58 are therefore applied to a composite shift register 64 – 80, in which each of elements 64 to 70 inclusive and 74 to 80 inclusive comprises a single bistable type shift register unit and unit 72 comprises a multiple unit having (L–8) bistable units in series, where L is the total number of clock pulses (and therefore sampling points) in one line scan period. For the time being shift register 64 to 80 will be considered to comprise a single unit and this is generally designated 82.

Upon coincidence with a gating signal and a line scan intersect pulse 65 (see FIG. 1) signal from junction 58 will appear at junction 86 and since this signal is coincident with the gating pulse appearing at junction 50, and which via OR-gate 88 appears at junction 90, both inputs of AND-gate 92 are provided with signal and the output of the AND-gate 92 will provide a 1-state for the input to shift register 82 for the duration of the coincidence between the gating signal and the line scan intersect pulse 65. The shift register 82 is continuously shifted by clock pulses applied thereto and the 1-state applied to the input is thereby shifted through the register and will reappear at the output at junction 94 one line scan period later.

Appearance of this pulse at junction 94 will provide an input for OR-gate 88 during the line scan immediately following that during which it was generated. The same pulse is applied via OR-gate 96 and OR-gate 52 to junction 56 thereby allowing any detected video signal pulse at junction 34 and coincident therewith, on that, to appear at junction 58. As during the first line scan intersection with the feature, the output at junction 58 is transmitted to junction 86 and in combination with the output from OR-gate 88 the coincidence signals will produce a 1-state in the output of AND-gate 92 which is again transmitted to the input of register 82.

Coincidence of signal at junction 86 and at 94 is also detected by AND-gate 98 and the coincident output therefrom is employed to set a bistable device 100 whose Q output is applied to a further input of OR-gate 88. Bistable device 100 is only reset upon the disappearance of signal at junction 86 due to the effect of inverting amplifier 102. Consequently the Q output of bistable device 100 is applied continuously to OR-gate 88 for the duration of the line scan intersect pulse 104 (see FIG. 1) on the next line. However it will be seen that since the delayed pulse 84 from the previous line (via register 82) does not begin with the onset of the pulse 104, the first portion of this pulse will be lost as happened to the part 67 from pulse 65 on the previous line.

For the purpose of demonstrating this deficiency, a typical feature 11' is shown in FIG. 3 intersected by a typical trace 26 from a light pen (not shown) positioned to the right and above the feature 11'. The horizontal lines 106 in FIG. 3 illustrate the line scan intersect pulses which will be obtained at junction 58 for feature 11' in the event that the system of FIG. 2 comprises only those integers so far described.

In order to overcome this deficiency, so-called look-ahead is provided by providing the OR-gate 96 with outputs from register units 72, 74, 76, 78 as well as 80. In this way a signal will be applied to junction 56 up to four sampling points (= picture point intervals) earlier than would be the case if OR-gate 96 was only supplied with signal from junction 94. The effect is illustrated in FIG. 4 in which the same feature 11' is shown intersected by the same tracer 26 and in which the line scan intersect pulses released by gate 54 are illustrated by horizontal lines 108.

Whilst the provision of the so-called look-ahead ensures that a large proportion of the area of a feature such as 11' is represented by the detected video signal information obtainable from the intersect pulses appearing at junction 58, the look-ahead facility will have the effect of including intersect pulses at junction 34 from features which enter the look-ahead region in front of the leading edge of the feature 11'. This is illustrated clearly in FIG. 5 in which the same feature 11' is shown intersected again by the same tracer 26 and in which the limit of the look-ahead on each line scan is denoted by the dots 110. The locus of these dots intersects a second feature 112 and each of the subsequent line scan intersect pulses arising from feature 112 is also released to junction 58.

This is clearly undesirable and a further refinement is provided in the system of FIG. 2 to inhibit this eventuality. It is for this reason that the first part of the register 82 is divided into 4 separate bistable units 64 to 70. A second "set" input is provided for each of these bistable units 64 to 70 which is driven from the output of an AND-gate 114, 116, 118 and 120 respectively each having two inputs — one common input from the output of an AND-gate 122 and the other from each of four series connected bistable shift register units 124, 126, 128 and 130 respectively.

AND-gate 122 is provided with two inputs from junction 94 and from a further bistable shift register unit 132 via inverting amplifier 134. A 1-state therefore obtains at junction 136 in the event that there is a 1-condition at junction 94 which has been preceded by a 0-condition now present in the output of shift register unit 132. AND-gate 122 therefore provides an output at junction 136 immediately the leading edge of a line scan intersect pulse, delayed from a previous line, appears at junction 94.

The signal at junction 58 is also supplied to junction 138 and constitutes an input to the four series connected shift register units 124 to 130 inclusive. The binary values of the last four sampling signals immediately preceding the appearance of a leading edge of a delayed pulse from a previous line are thus stored in the units 124 to 130. On receipt of a signal at junction 136, the signals appearing at junctions 140, 142, 144 and 146 respectively will be transmitted via AND-gates 114 to 120 respectively to the second set inputs of the bistable units 64 – 70 respectively.

The actual signals appearing at junctions 140 to 146 depend on whether the bistable units 124 to 130 are in their set or reset condition. If in their reset condition, the signals at junctions 140 to 146 will be 0 and no signal will be transmitted via AND-gates 114 to 120, to the bistable units 64 to 70 inclusive.

The state of the bistable units 124 to 130, is controlled by AND-gate 148 whose two inputs are supplied with signal from junction 138 via inverting amplifier 150 and from junction 94 via inverting amplifier 152.

If coincident 0-condition is detected on both the current and previous line scan, all the shift register units 124 to 130 are reset.

The effect of the auxiliary shift register 124 to 130 and AND-gates 114 to 120 is demonstrated in FIG. 6. In view of the look-ahead region, intersect pulses 154 from a feature 156 which partially lies in the capture zone of the larger, "detected" feature 158, pass to junction 58. However, since coincident 0-condition will occur during the look-ahead period between each pulse 154 and the leading edge of each intersect pulse on the same line from feature 158, the units 124 to 130 will all be reset to 0 before the leading edge signal arrives at the input to register 82. Hence the look-ahead locus will still follow the leading edge of feature 158 and will not immediately transfer to feature 156, as between features 11 and 112 in FIG. 5.

The shape of feature 158 (FIG. 6) has been chosen to show a feature having "two" leading edges. The second (162) generates its own look ahead period and all the intersect information occuring between each of the points 164 and edge 162 will be cancelled in the register units 64 to 70. This will eliminate the capture of any feature lying within the re-entrant region of the feature 158. However, due to the action of inverting amplifier 102 and bistable 100, each intersect pulse from the left hand limb of feature 158 will be passed through gate 54, without being shortened.

If a four-picture-point-interval delay is acceptable in the signal supplied to the computer, the signal at junction 160 may be employed as the output to the computer in place of that at junction 58. Intersect pulses 154 are eliminated from such a signal.

It is to be observed that the data provessing circuit below the junction 50 in FIG. 2 may be employed with any suitable feature selecting device by which the coordinates of at least one point of a feature may be selected and not necessarily a light pen.

It will be appreciated that although two AND-gates 54 and 60 have been shown, in FIG. 2, gate 60 is redundant if junction 58 is connected directly to junction 62.

Although the system of FIG. 2 incorporates four-picture-point-intervals of look-ahead, it will be seen that any number of intervals may be chosen, the number simply being equal to the number of separate bistable shift register units employed before and after shift register 72. Thus four before and after 72 give four picture points of look-ahead.

The look-ahead provided by the circuit of FIG. 2 will allow the detected video signal pulses to follow an advancing leading edge of a feature provided it does not advance at a greater rate than the look-ahead facility. This disadvantage can be removed thereby allowing the pulses to follow even a sudden advance of a leading edge, by employing the modification of FIG. 7.

By this modification the signal at junction 58 is no longer applied to a computer. Instead the incoming detected video signal pulses at junction 34 are applied to the input of a computing device 170 which computes a parameter (such as length) from every detected video signal pulse supplied to it. The output from the device 170 is gated by an AND gate 172 which receives a release signal coincident with the end of the pulse if the latter is the first of a selected feature or is coincident with a previous pulse arising from scanning the feature. If gate 172 receives such a release signal, the parameter value accumulated from that particular line scan pulse in device 170 is released to a second computing device 174 which serves to accumulate all individual parameter values from any one field. The accumulated value for each field is released by an end-of-frame sample signal applied to an AND-gate 176, gating the output from device 174.

The release signal for gate 172 is derived from the SET output Q of a bistable device 178. A set signal for this device is obtained from an AND-gate 180 having detected video signal pulses from 34 applied to one input and the output of an OR gate 182 applied to its second input. The OR-gate 182 has two inputs, one from junction 50 so taht a SET signal for 178 is generated during the first pulse from a selected feature and the other from junction 94 so that if a coincident pulse appears on a succeeding line scan it will provide a SET input to bistable device 178.

An AND-gate 184 prevents the Q-output from bistable 178 being applied to gate 172 except at the end of a detected video signal pulse. This is achieved by inverting the detected video signal pulses in inverting amplifier 186, generating a short duration pulse by monostable device 188 from the leading edge of each pulse obtained by inversion (i.e., corresponding to the trailing edge of an actual detected video signal pulse) and applying the output from monostable 188 to the second input of AND-gate 184.

A reset signal for bistable 178 is obtained by inverting the output from monostable 188 by inverting amplifier 190 and producing a reset pulse by a second monostable pulse generator 192 operating from the leading edge of the output pulses from amplifier 190.

Monostable device 192 also provides a reset signal for the line computing device 170 to cancel its accumulated value at the end of each pulse from monostable device 188.

The system shown in FIG. 8 is designed to analyse the contents of the field of view of a microscope 210 whose final image is focussed on the target of television camera tube shown diagrammatically at 212. The target is scanned in conventional manner to generate a video signal which is amplified by video amplifier 214 applied to junction 216. The signal at junction 216 provides one input to a detector 218 in which the instantaneous amplitude of the video signal at 216 is compared with a threshold voltage and a detected signal is generated and appears at junction 220 (which corresponds to junction 34 to FIG. 2) having one value when the instantaneous amplitude exceeds the threshold voltage and its other value when the instantaneous amplitude is below the threshold voltage.

As shown the signals at junction 216 and 220 are both supplied to a television monitor shown diagrammatically at 222. Connections (not shown) are provided for displaying on the monitor both the video signal at junction 216 and/or the detected signal at junction 220. In normal operation only the signal at junction 216 is displayed on the screen. A light pen 224 is provided, the purpose of which is to identify one of the features such as 226 and to release the detected signal pulses relating to that feature. Conveniently the display of the selected feature on the monitor screen is made brighter than its surroundings.

As described earlier a trace signal is generated from an electrical pulse derived from the illumination arising from a portion of the monitor screen within the field of view of the light pen 224 and the signal so generated is also supplied (by connections not shown) to the monitor 222 to produce a trace display 228 on the monitor screen.

The signal at junction 56 of FIG. 2 is applied to a gate 240 which controls th passage of the video signal from junction 216 to a first computer 244. AND-gate 54 of FIG. 2 controls the passage of detected signal pulses from junction 220 (= 34 of FIG. 2) to a second computer 246.

As described in more detail in our British Patent Application No. 9737/71, computer 244 is adapted to generate a signal which is indicative of the total volume of a feature under analysis from the signal available during each frame scan. Thus at the end of scanning the specific feature identified by the light pen a signal indicating the computed volume value for the feature will appear at junction 248.

Computer 246 is designed to calculate the area of a specific feature isolated by light pen 224 from the signal pulses forming the detected signal at junction 220. Thus at the end of scanning the specific feature isolated by the light pen 224, a signal indicating the area value for the specific feature will appear at junction 250.

To simplify the synchronism, a single deflection voltage generator (not shown) is employed to generate the scan deflection signals applied to the camera and monitor and reset signals for the computers 244 and 246 are conveniently derived from the frame scan synchronizing pulses. In this way the output from each computer 244 and 246 is "wiped clean" at the end of each frame scan.

The gating signal generator 238 operates in a manner to release a gating signal pulse for the duration of each line scan intersection with the specific feature whose boundary is intersected by the trace generated by the light pen. The gating pulses so generated are delayed for a time interval of approximately equal to one line scan period and as previously described, the delayed gating signal pulses are compared in a coincidence gate with the incoming detected signal pulses from junction 220 and subsequent gating signal pulses generated so long as there is coincidence between a delayed gating signal pulse and a pulse in the detected signal output at junction 220. In this way the gating signal pulses define a so-called coincidence region which will approximately follow the shape of the specific feature selected by the light pen and the pulses which are applied to open gates 240 and 242 thereby define a small blank frame. The signals at junction 56 are also applied to the monitor 222 and the signal pulses defining this small blank frame are arranged to operate a gate (not shown) to gate the detected signal pulses supplied from junction 220 to the monitor 222. In this way only those detected signal pulses which coincide with the blank frame are allowed to additionally modulate the scanning electron beam in the monitor tube to brighten up the specific feature.

Although not shown, a further reset signal is derived from the frame synchronising pulses to remove the trace inhibit signal at the end of each complete frame scan. In this way during a subsequent scan the trace signals are once again generated to generate a subsequent trace which if the pan has not been moved, will correspond exactly to the trace generated during the previous frame scan and an identical set of gating signals and therefore bright-up signals for the monitor 222 will be generated.

The output from computer 244 which appears at junction 248 during each successive frame scan can be applied to an accumulator A1 (which serves as a signal storage device) via gate 252 or accumulator A2 via gate 254. Only two accumulators and respective gates are shown but it will be appreciated that many more may be provided and to this end the signal line from the computer 244 is shown continued and dotted. Gate 252 is opened by means of signal from a hold circuit 256 and gate 254 by a signal from a hold circuit 258. In a similar manner the output from computer 246 appearing at junction 250 can be applied via two gates 260 and 262 to two separate accumulators B1 and B2 and the gates 260 and 262 are opened by control signals from two further hold circuits 264 and 266 respectively. As with computer 244, more than two accumulators B1 and B2 may be provided for the output from computer 246 and to this end the signal path from computer 246 is shown continued and dotted. The only criterion which must be satisfied is that the number of accumulators A1, A2 must be the same as the number of accumulators B1, B2 etc.

Switches S1A and S1B are ganged for simultaneous operation as are also S2A and S2B and any corresponding pairs of switches controlling any further hold circuits and gates for other pairs of accumulators not shown. Closing switches S1A and S1B applies a signal from a power supply 68 to the two hold circuits 256 and 264. The operation of each hold circuit is identical and the operation of hold circuit 256 alone will therefore be described.

The hold circuit 256, is provided with a further input denoted X. This denotes a signal derived from each frame synchronizing pulse and the operation of the hold circuit is such as to generate an output signal to open gate 252 only when both a signal from 268 and a frame synchronizing pulse have been received by the hold circuit 256. Gate 252 is thus opened at the beginning of the first new frame scan after switch S1A has been closed. During this frame scan the output signal at junction 248 is supplied to accumulator A1 and the hold circuit includes one further input derived from the output of the gate 252. This further input is arranged to sense the end of the output signal from junction 248 which is arranged to inhibit the further output signal from the hold circuit 256 to therefore close gate 252 after the output signal during the frame scan has been fed to the accumulator A1. An interlock is provided with the signal from switch S1A which inhibits any further output signal from hold circuit 256 until S1A has been opened and subsequently closed. Thus the interlock provides a one-off operation of hold circuit 256 and gate 252 to prevent the subsequent application to the accumulator A1 of computed values from computer 244 during subsequent frame scans. In this way a single value for the parameter computed by computer 244 is obtained for the specific feature identified by the light pen 224 and, allowing a short pause after depressing the switch S1A the light pen can be transferred to another feature and the process repeated.

Since switches S1A and S1B are ganged, an identical operation will be performed in the output circuit of computer 246 and the computed value for the parameter measured by computer 246 during the same frame scan will be transferred to accumulator B1.

If alternatively switches S2A and S2B were closed the gating operation would involve gates 254 and 262 and the values computed during the selected frame scan would be applied to accumulators A2 and B2 respectively. It is thus possible to channel the computed values for any one feature to either accumulators A1 and B1 or accumulators A1 and B2. As previously mentioned, by providing additional accumulators and related switching, holding and gating circuits the computed values may be channelled to any of the accumulator pairs and by selecting the same accumulator pair for features having a similar characteristic it is possible to, for example, accumulate the total area of circular features in accumulator B1 and the total volume of those features in accumulator A1. Likewise the area of all features having a generally triangular shape such as 270 can be accumulated in accumulator B2 and the total volume of all such features in accumulator A2.

Switches S1A, S2A, S1B, S2B etc. may be any convenient type but are preferably electronic (e.g., solid state) switches and the control voltages therefor are supplied from push-button switches 272, 274 mounted on the body of the light pen 224 as shown in FIG. 9.

Alternatively foot operated switches (not shown) may be provided or push-button switches (not shown) mounted adjacent to the monitor screen 222.

I claim:

1. A circuit arrangement for selecting a feature by means of a light pen from a picture displayed on a c.r.t. employing line scanning comprising, in combination with a light pen, first circuit means for recirculating at approximately line scan period intervals an electrical pulse generated by the light pen, a threshold detector for generating intersect pulses from detected amplitude excursions of the video signal displayed on the c.r.t., second circuit means for sensing coincidence between a generated pulse and an intersect pulse occuring during one of the scan lines of the displayed picture and further gating means for releasing at least the coincident portion of the intersect pulse and at least the coincident portion of each intersect pulse arising on a subsequent line scan which is at least in part coincident with a signal released by said further means on the preceding line scan.

2. Circuit arrangement set forth in claim 1 further comprising third circuit means responsive to coincidence of an intersect pulse and a generated pulse, which on detecting coincidence, inhibits the further recirculation of the generated pulse.

3. Circuit arrangement set forth in claim 1 in which the gating means which releases the first and subsequent intersect pulses for the selected feature employs each such intersect pulse as a gating signal to release some or all of any intersect pulse coincident therewith on the next line scan.

4. Circuit arrangement set forth in claim 1 further comprising, third circuit means adapted to open the gating means for each succeeding line scan earlier in time than if the intersect pulse from the preceding line alone were employed to control the gate.

5. Circuit arrangement set forth in claim 1 wherein the intersect pulses released, gate the video signal whereby the amplitude variations of the video signal arising from scanning the selected feature may be isolated from those corresponding to the remainder of the field.

6. Circuit arrangement set forth in claim 1 further comprising a bistable device which is set by a generated pulse and is only reset at the end of a complete field scan.

7. Circuit arrangement set forth in claim 6 further comprising a monostable device which generates the said generated pulse from the leading edge of the set condition output signal of the bistable device.

8. A circuit arrangement as set forth in claim 1 wherein the c.r.t. is of the so-called dual phosphor type, one component of which emits visible light and the other of which emits ultra violet light.

9. A circuit arrangement as set forth in claim 8 wherein the light pen is substantially insensitive to visible light and is sensitive to ultra violet light.

10. A circuit arrangement for selecting a feature by means of a light pen from a picture displayed on a c.r.t. employing line scanning and thereby releasing electrical signals relating to the selected feature alone, comprising, in combination, at least one computer means for computing a value for a parameter of the specific feature from the released signals relating thereto, at least two accumulating signal storage means for storing computed value signals from the computer means and selection switch means for selecting one of the stores for storing a computed value signal.

11. A circuit arrangement as set forth in claim 10 wherein the electrical signals relating to the feature ar the amplitude variations of the video signal obtained from scanning an image of the field containing the feature, by a television camera.

12. A circuit arrangement as set forth in claim 10 wherein the electrical signals relating to a feature are the electrical pulses forming a so-called detected signal obtained by threshold detecting the amplitude variations of the video signal obtained by scanning the field or an image thereof, containing the feature.

13. A circuit arrangement as set forth in claim 10 further comprising push button means on the light pen for controlling the operation of said selection switch means.

14. A circuit arrangement as set forth in claim 10 further comprising foot operated means for controlling the operation of said selection switch means.

15. A circuit arrangement as set forth in claim 10 further comprising push button means adjacent the c.r.t. for controlling the operation of said selection switch means.

16. A light pen for use with a circuit arrangement as set forth in claim 10 comprising, in combination, a photosensitive device, means for focussing light emitted by a c.r.t. onto the photosensitive device, a tubular body member housing the photosensitive device and the focussing means, cable means for transmitting electrical signals generated by the photo-sensitive device in response to light falling thereon to release electrical signals relating to the selected feature to the computer means, and switch means located on the light pen body for selectively connecting the computer output to one of the stores.

* * * * *